Jan. 13, 1942.  W. M. LAWRENCE  2,269,774
MOWING MACHINE
Filed Dec. 18, 1939   2 Sheets-Sheet 1
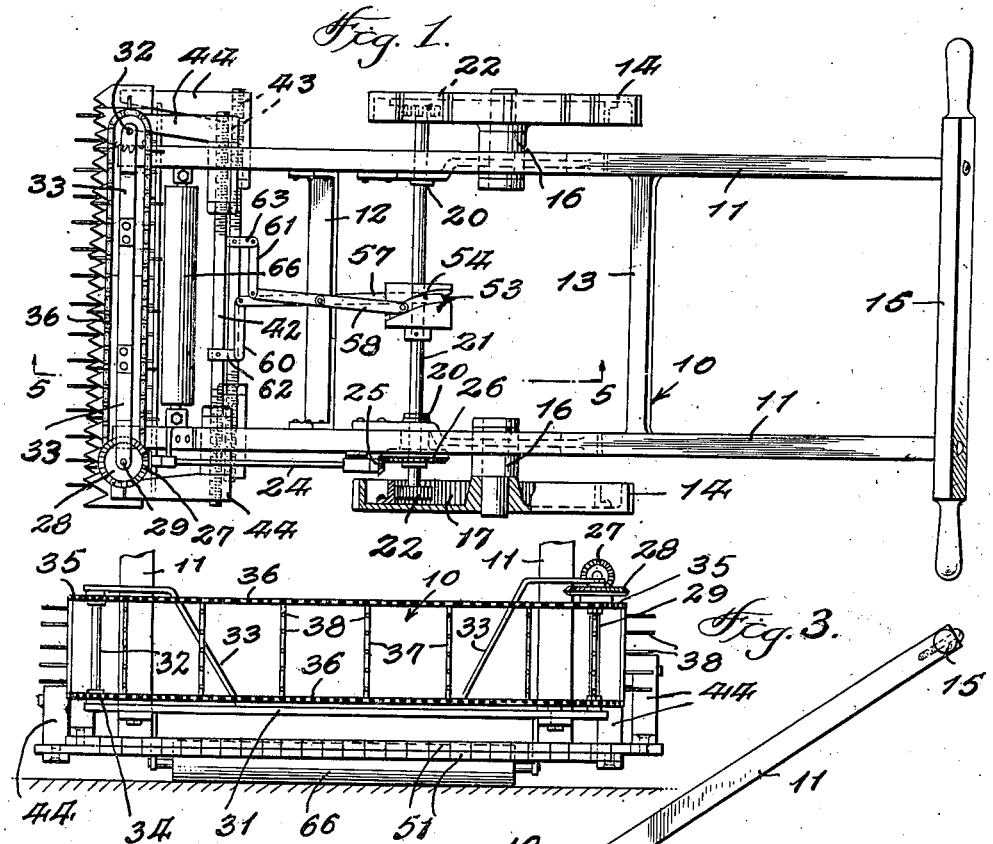
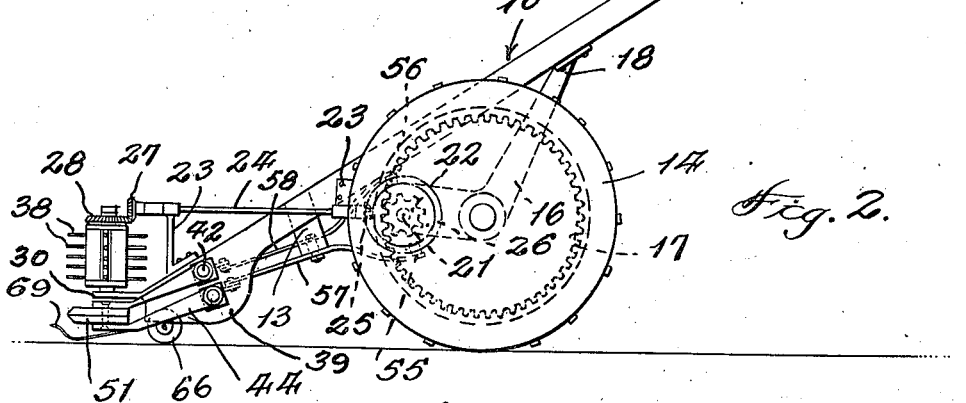
Inventor
Walter M. Lawrence
By Christian L. Nielsen
Attorney Jan. 13, 1942. W. M. LAWRENCE 2,269,774
MOWING MACHINE
Filed Dec. 18, 1939 2 Sheets-Sheet 2
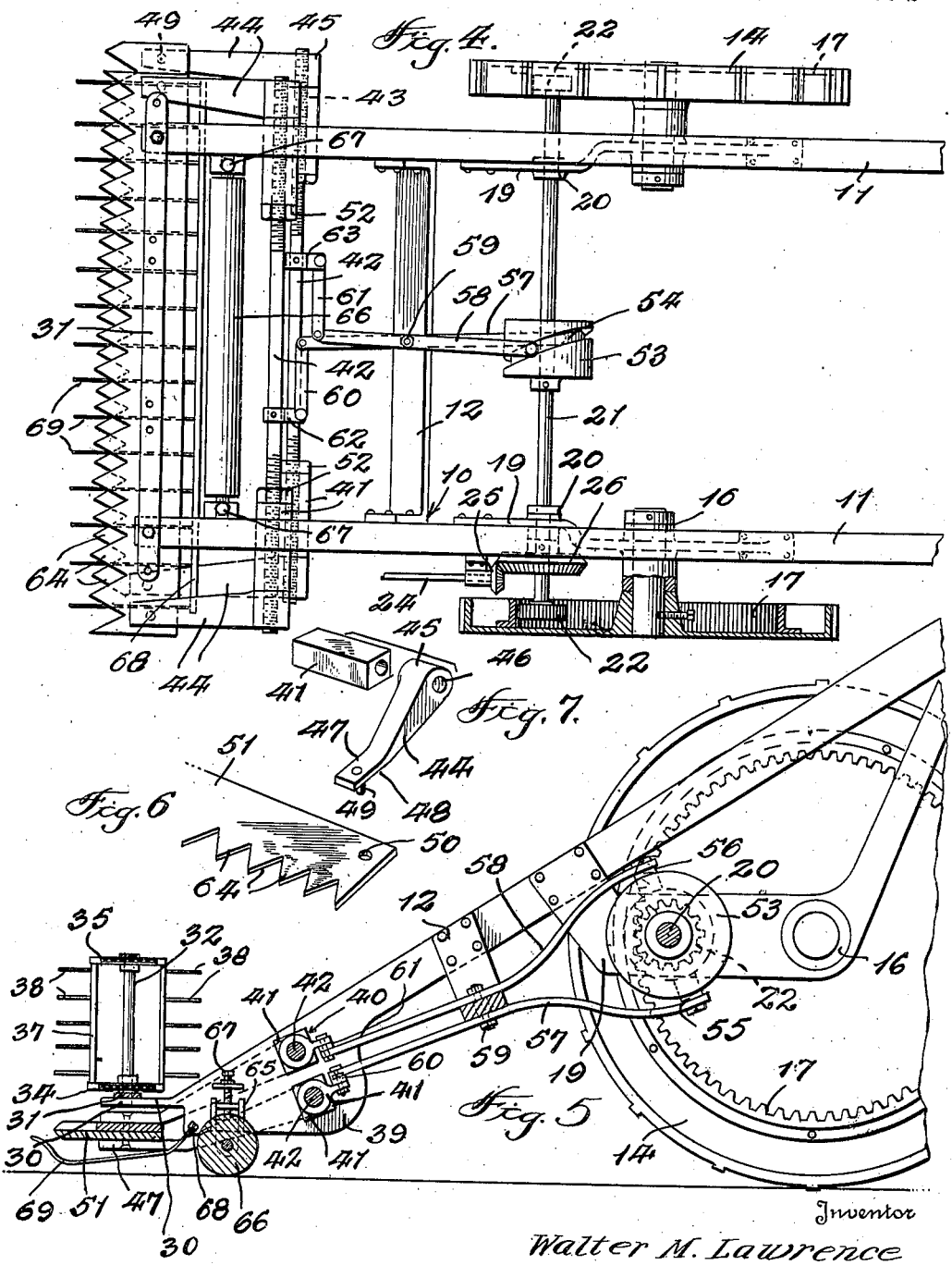
Inventor
Walter M. Lawrence
By Christian R. Nielsen
Attorney Patented Jan. 13, 1942

2,269,774

UNITED STATES PATENT OFFICE 2,269,774

MOWING MACHINE

Walter Marcellus Lawrence, Biloxi, Miss., assignor of one-half to Joseph A. Bishop, Biloxi, Miss.

Application December 18, 1939, Serial No. 309,915

4 Claims. (Cl. 56—263)

This invention relates to lawn mowers and mowing machines generally, and it consists in the constructions, arrangements and combinations herein described and claimed.

It is a cardinal object of the invention to provide a novel construction of cutting means, wherein a pair of cutting blades are longitudinally tensioned, stretched or drawn to effect a perfect mutual contacting engagement with each other, thus obtaining a proper cooperation between the cutting edges of the knives during operation of the mower.

It is also important objects of the invention to provide novel means for actuating the cutting blades; to readily obtain longitudinal tensioning of the blades and to provide a machine in which the cutting operation may be effected close against hedges, fences and the like.

It is a still further object of the invention to provide a mowing machine in which the traction wheels do not travel upon uncut grass; and to provide a mower in which the cutting operation is effected by a straight forward movement of the machine.

It is also an object of the invention to provide a novel means for removing cut grass or vegetation to one side of the machine, so that the cut material will not interfere with the normal cutting operation.

It is still further objects to provide a mowing machine which will cut grass or vegetation regardless of height, and finally to provide a mower which seldom requires adjustment and in which the cutting blade may be readily removed for sharpening and replaced, without the special skill or tools.

Additional objects, advantages and features of invention will be apparent from the following description, considered in conjunction with the accompanying drawings, wherein, Figure 1 is a top plan view of the mower.

Figure 2 is a side elevation thereof.

Figure 3 is a front elevation.

Figure 4 is an enlarged top plan, parts being broken away;

Fig. 5 is an enlarged sectional view on the lines 5—5 of Figure 1.

Figure 6 is a fragmentary perspective view of one of the cutting blades.

Figure 7 is a detail perspective view of the blade mounting and tensioning means.

Figure 8 is a detail perspective view of a modified form of blade mounting and tensioning means.

There is illustrated generally a frame 10, in the present instance comprising a pair of longitudinal side members 11, connected transversely by members 12 and 13 maintaining a proper spacing of the members, as well as to affording rigidity to the structure. The members 12 and 13 are preferably positioned forwardly and rearwardly of the supporting or traction wheels 14 of the mower, respectively, as shown.

The fore end of the frame mounts the cutting mechanism presently to be described, and the rear terminals of the side members 12—13 mount a handle 15 for effecting forward movement of the mower.

The side members 11 each have a depending bearing 16 revolubly mounting the traction wheels 14 upon respective stud axles. Each wheel 14 includes peripheral lugs effecting proper traction and are also provided with an internal gear 17, for a purpose to be now described.

The bearings 16 each comprise a rearwardly extended arm 18 and a forward arm 19 each of which include means for securement to respective side members. The forward arms 19 are provided with aligned bearings 20 for revolubly mounting a shaft 21, respective ends of which have keyed thereto a spur gear 22 adapted to mesh with respective internal gears 17 of each wheel.

One of the side members 11 has fixed thereon a pair of bearing brackets 23 which revolubly support a longitudinally extended shaft 24. One end of the shaft 24 having fixed thereto a bevel gear 25 in mesh with a similar gear 26 fixed to the shaft 21. The other end of the shaft 24 also has a bevelled gear 27, in mesh with a gear 28 carried upon an upright shaft 29 of a grass-removing apparatus now to be described, attention being directed particularly to Figure 5 of the drawings.

The side members 11 terminate at their lower ends in flat planiform horizontal portions 30 for rigid support of a transverse bar 31, the ends of which support respective upright shafts 29 and 32. The upper ends of the shafts 29 and 32 are supported and braced by angle brackets 33, one end being fixed to the bar 31 as shown in Figure 1.

The shafts 29 and 32 are revolubly supported between the bar 31 and brackets 33 and each shaft 29 and 32 has fixed thereon vertically spaced sprockets 34 and 35, the sprockets on one shaft being aligned with sprockets of the other shaft to receive respective endless sprocket chains 36. There is thus provided a pair of vertically spaced chains adapted to travel about the sprockets during operation of the machine. The chains 36 are connected by vertical shafts 37 suitably spaced apart longitudinally of the chains, and fixed against rotation. Each shaft 37 includes a plurality of vertically spaced tines 38, extended outwardly at right angles to the shafts 37.

As clearly shown in Figure 5 the tines 38 are disposed immediately above the cutting mechanism of the machine, and in operation, rotation of the shaft 24 will impart rotation of the chains 36 simultaneously, the tines thereby functioning to remove cut grass to one side of the machine out of the forward travel thereof. Thus the cut grass or other vegetation cannot interfere with the efficient operation of the machine.

Each side member 11 has a downwardly extended enlargement 39 provided with a pair of angularly shaped openings 40, the openings in the present instance being shown as square. The openings 40 are spaced one above the other, each receiving a bearing sleeve 41 complemental to the openings, the sleeves being transversely movable through the openings 40. Each sleeve 41 is provided with a smooth bore extended longitudinally of the sleeve, as clearly shown in Figure 7.

In each pair of aligned bearing sleeves 41 a combined mounting and stretcher rod 42 is slidably arranged, the rods 42 being threaded at respective ends as at 43, the threads extending inwardly a substantial distance, for a purpose as will presently appear. It should be noted that the threads at one end of the rods are left handed while at the other end the threads are right handed.

An arm 44 is provided, having a head 45 internally threaded as at 46, the threads being complemental to the threads of one end of a rod 42 when engaged thereon. The arm 44 has a reduced terminal portion 47, the under face 48 of which is planiform and smooth, and projecting from such face there is a pin 49, adapted to be inserted in an opening 50 positioned adjacent the end of a cutter blade 51.

A lock nut 52 is engaged upon respective threaded portions 43 inwardly of the sleeves 41, in opposed relation to the arms 44, the lock nut 52 serving to lock the arms and shafts in a desired position, as will be explained hereinafter.

As may be readily seen from Figure 5, the arms 44 are arranged in pairs, the planiform faces 48 with their respective pins 49 being arranged in opposed relation to each other, the faces 48 and pins 49 supporting respective cutter blades 51. It should also be noted that the pins 49 are of such length as to stop flush with or below the surface of the blades, so that the blades may be freely reciprocated as will be explained hereinafter.

In the medial portion of the shaft 21 there is keyed or otherwise secured a cam 53 having a diagonal peripheral cam groove 54, receiving rollers 55 and 56 of reciprocative operating levers 57 and 58. As shown, the lever 57 is positioned beneath the transverse bar 12, while the lever 58 is disposed above the bar 12 and pivoted thereto by a bolt 59. The levers diverge outwardly in a rearward direction so as to partly embrace the cam 53, and at their extremities the rollers 55 and 56 are mounted, extended at right angles for disposition in the cam groove 54.

The forward end of the levers 57 and 58 are pivotally connected with short links 60 and 61, each of which are pivotally connected to lugs 62 and 63 respectively, secured to respective stretcher shafts 42. It should be noted that the lugs 62 and 63 are positioned outwardly of the longitudinal axis of oscillation of the levers 57 and 58.

From the foregoing, it will be seen that forward propulsion of the mower will cause rotation of the cam, with consequent alternate movement of the levers 57 and 58 which in turn imparts alternate reciprocation of the cutter blades, effecting a cutting operation upon vegetation in the path of opposed V-shaped cutting edges of the teeth 64 formed on the forward edges of the blades.

Also, the gears 25 and 26 will provide rotation of the shaft 24 with consequent rotation of the gears 27 and 28, thus causing movement of the endless chains 36 in a direction to remove cut vegetation to one side of the machine.

The enlargement 39 of the frame members also provide means for attachment of brackets 65 for mounting of an adjustable support roller 66. The roller 66 may be vertically adjusted by means of the screw 67 for regulating the height of cut of the blades 51. The enlargement 39 also mounts a bar 68 having a plurality of longitudinally spaced fingers 69, forwardly extended, beneath the blades 51 functioning to direct vegetation into the cutting blades.

The lugs 62 and 63 are preferably secured to the stretcher shafts by means of set screws or similar fastening means, so that the lugs may be readily released to permit adjustment of the blades 51 as will now be explained.

The blades 51 as shown are in mutual face to face contact, normally to effect the best cutting operation, and in such case, through wear or otherwise, these blades may become spaced apart to an undesirable degree, but this difficulty may be overcome through longitudinal tensioning, stretching or drawing of the blades. Or, where the machine is to be operated upon a very coarse growth of vegetation it might be desirable to lessen the stretch or tension of the blades, permitting a slight spacing of the faces of the blades to more effectively cut the vegetation.

Attention is now invited to Figures 1 and 4 of the drawings for an understanding of the blade adjustment. The lugs 62 and 63 are loosened to permit longitudinal movement of the stretcher rods 42. The lock nuts 52 are loosened and the rods 42 then turned in the direction desired. Rotation of the rods 42 in a right handed direction causes arms 44 to separate, due to the right and left handed threads on the rods 42, thereby stretching, drawing or tensioning the cutting blades. After the proper adjustment as to spacing of the blades is attained, the lock nuts 52 are brought into locking engagement with the sleeves 41 to secure the adjustment. The set screws of the lugs 62—63 are then tightened.

It will be apparent that by tensioning, drawing or stretching the blades longitudinally a perfect contact and alignment is attained with just sufficient friction to produce a very effective cutting action.

The cutting blades 51 are of a length to extend laterally beyond the path followed by the traction wheels 14, and it will therefore be possible to cut vegetation close against fences, curbing and the like.

In Figure 8, I have illustrated a modified form for mounting the lower cutting blade. In this instance, the sleeve 41' is formed integrally with the arm 44', necessitating threading of the bore, as at 46', throughout its length. A locknut 52' engaged inwardly of the sleeve 41' provides for securement of the adjusted position of the mounting. This construction permits machining to a precise alignment and would provide a permanent guide for accurate adjustment of the upper arms and blade.

While I have specifically described my machine, this is by way of illustration only, and I consider as my own all such modifications in structure as fairly fall within the scope of the appended claims.

I claim:

1. In a mowing machine or the like, a frame comprising side members having supporting-traction wheels, said side members extending forwardly of the traction wheels, a shaft transversely of the frame and having operative connection with the traction wheels to rotate the shaft, a cam fixed to the shaft, said cam having a peripheral cam groove, a pair of sleeves carried by each side member at the forward ends, the sleeves of one side member being aligned with sleeves of the other side member, said sleeves being longitudinally slidable, but non-rotative, each sleeve having a longitudinal bore, a rod extended through aligned sleeves, each rod having right hand screw threads on one end and left hand screw threads on the other end, an arm threadedly engaged on respective ends of the shafts, each arm having a forward planiform extension, the planiform extension of one arm being in opposed relation to the planiform extension of the other arm, each planiform extension having means for connection with a flat flexible cutting blade, each blade having V-shaped cutting teeth, said blades having mutual contacting engagement throughout their lengths, a lock nut on each threaded portion of the shafts in bearing engagement with respective sleeves, link means connected with each rod, and an oscillatable lever connected with each link, each lever having a roller complemental to the cam groove.

2. In a mowing machine, a frame having supporting traction wheels, cutting mechanism carried by the frame comprising a pair of superposed flat, flexible cutting blades, means operable through the traction wheels and connected with the blades for reciprocating the blades in opposite directions, means connected adjacent the ends of the blades for longitudinally tensioning said blades to vary the frictional contact therebetween and means for locking the blades in adjusted longitudinal positions.

3. In a mowing machine or the like, a frame having supporting traction wheels, said frame extending forwardly of the traction wheels, a shaft transversely of the frame and having operative connection with the traction wheels to rotate the shaft, a cam fixed to the shaft, said cam having a cam groove, a cutting mechanism carried at the front end of the frame comprising a pair of closely adjacent superposed flat flexible cutting blades, each blade having V-shaped cutting teeth, means between each cutting blade and said cam groove for reciprocating the blades in opposite directions, means connected adjacent the ends of each blade, adjustably longitudinally for tensioning said blades, and means for locking the blades in adjusted longitudinal positions.

4. In a mowing machine or the like, a frame having supporting traction wheels, cutting means carried by the frame comprising a pair of closely adjacent superposed, flexible, flat toothed blades, a shaft connected between the ends of respective blades and adjustable longitudinally to vary the tension and spacing between the blades, link means connected to each shaft and operable through the traction wheels for reciprocating the shafts and blades in opposite directions and means for locking the blades and shafts in adjusted longitudinal positions.

WALTER MARCELLUS LAWRENCE.